US007306356B1

(12) United States Patent
Ahmadi

(10) Patent No.: US 7,306,356 B1
(45) Date of Patent: Dec. 11, 2007

(54) ILLUMINATING ANGULAR DISPLAY SYSTEM

(76) Inventor: William Yaghoob Ahmadi, P.O. Box 70328, Los Angeles, CA (US) 90070

( * ) Notice: Subject to any disclaimer, the term of this patent is extended or adjusted under 35 U.S.C. 154(b) by 0 days.

(21) Appl. No.: 11/636,829

(22) Filed: Dec. 11, 2006

(51) Int. Cl.
*B64D 47/06* (2006.01)

(52) U.S. Cl. ........................................ 362/559; 40/545

(58) Field of Classification Search ................ 362/559, 362/812, 355, 359–360; 40/367, 415, 545, 40/553–554

See application file for complete search history.

(56) References Cited

U.S. PATENT DOCUMENTS 3,466,778 A * 9/1969 Varnell et al. ................ 40/616
5,832,642 A * 11/1998 Dalton ........................ 40/546
2004/0109330 A1* 6/2004 Pare ........................... 362/559

* cited by examiner

*Primary Examiner*—Thomas M. Sember
*Assistant Examiner*—Julie A. Shallenberger

(57) ABSTRACT

An illuminated angular display system is provided. The illuminating angular display system includes a body, with an interior and an exterior, a plurality of support members extending through the body, and a light enhancing system within the interior. The body includes, a first angled front panel opposing a second angled front panel, contacting a third angled top panel and a fourth angled top panel, respectively. A first and a second side panel contact a bottom panel, the bottom panel contacts the first and second angled front panels, where the first and second side panels contact the third angled top panel and the fourth angled panel. The light enhancing system includes a first and a second angled light emitting diode panel, including a plurality of light emitting diodes and a first and a second angled dispersing panel, including a light transmitting layer and a light dispersal layer.

20 Claims, 5 Drawing Sheets

ILLUMINATING ANGULAR DISPLAY SYSTEM

BACKGROUND OF THE INVENTION

1) Field of the Invention

This invention is related to internally illuminated displays.

2) Discussion of the Related Art

Internally illuminated displays commonly utilize a light box incorporating an array of equally spaced lamps behind a diffuse display panel and border, containing an image to be illuminated. The illumination is accomplished by the placement of lights directly behind the message or image, though lamps can outline the display panel as well. An illuminated display is usually formed of a structure or housing, comprised of either plastic or metal framing, a light device and a diffuse message or image layer. Existing art also uses a mirror in conjunction with the light, to enhance the illumination of the message or image. While the use of the mirror may provide enhancement of a message in short range viewing, its function is rendered ineffective when the display is viewed from great distances.

A beam of light reflects off a mirror at an angle of reflection equal to its angle of incidence. The best conventional mirrors are about ninety-five percent reflective. The rest of the light is lost through absorption. If a light ray strikes a mirror surface, it loses five percent at every "bounce," leaving reduced illumination at that angle equal to its incident angle. Beams reflected by mirrors do not provide the proper illumination to discern messages or images viewed from long distances.

The disadvantages of current technology are an inability to meet long range viewing requirements, such as those seen on the nations highways and freeways, and at the same time, contend with environmental and other adverse conditions. Current technology is unable to remain visible in direct sunlight, in conditions of low light, darkness or fog, essentially translating into an inability effectively capture and transmit available light.

BRIEF DESCRIPTION OF THE DRAWINGS

The invention is described by way of example with reference to the accompanying drawings wherein.

DETAILED DESCRIPTION OF THE INVENTION

Figure 1:
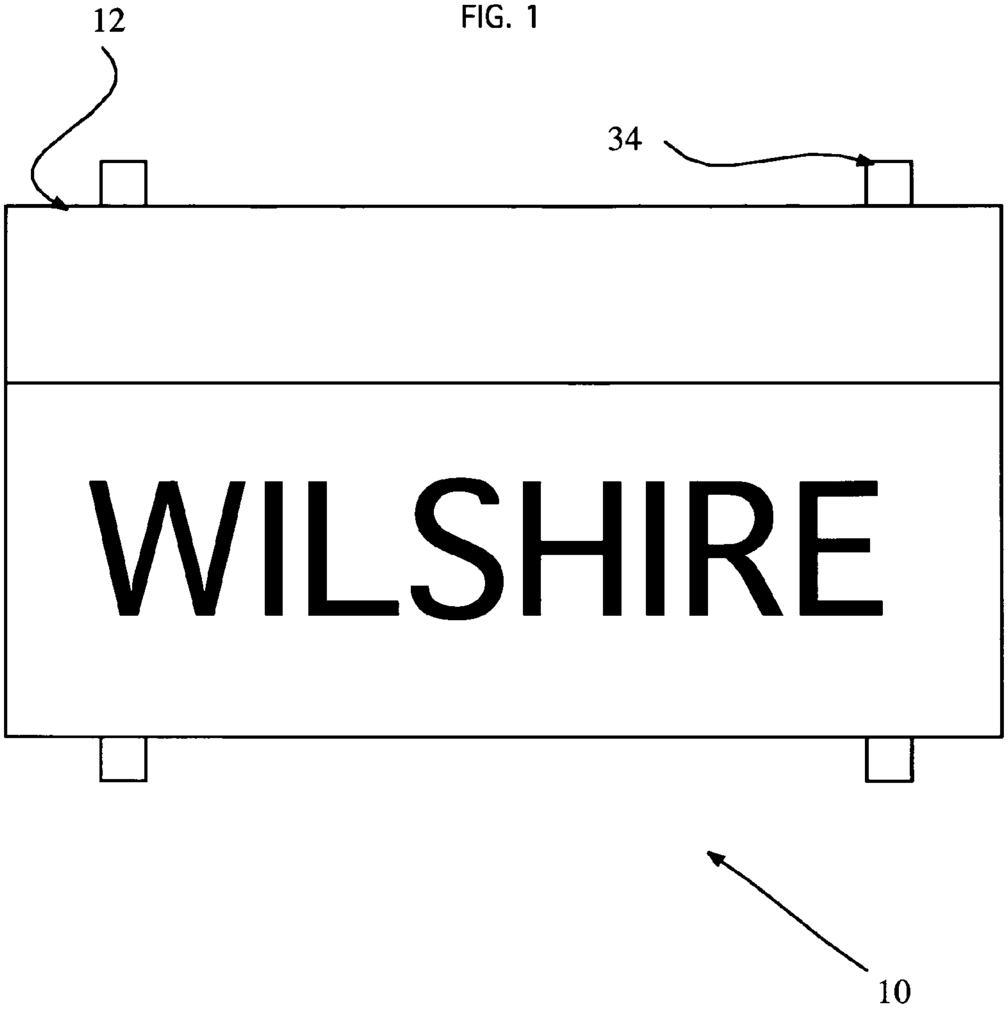
FIG. 1 is a front perspective view of an illuminated angular display system.

FIG. 1 of the accompanying drawings illustrates an illuminating angular display system 10 according to an embodiment, which includes a body 12, a plurality of support members 34 and as illustrated in FIGS. 2, 3, 4 and 5, a light enhancing system 36.

Figure 2:
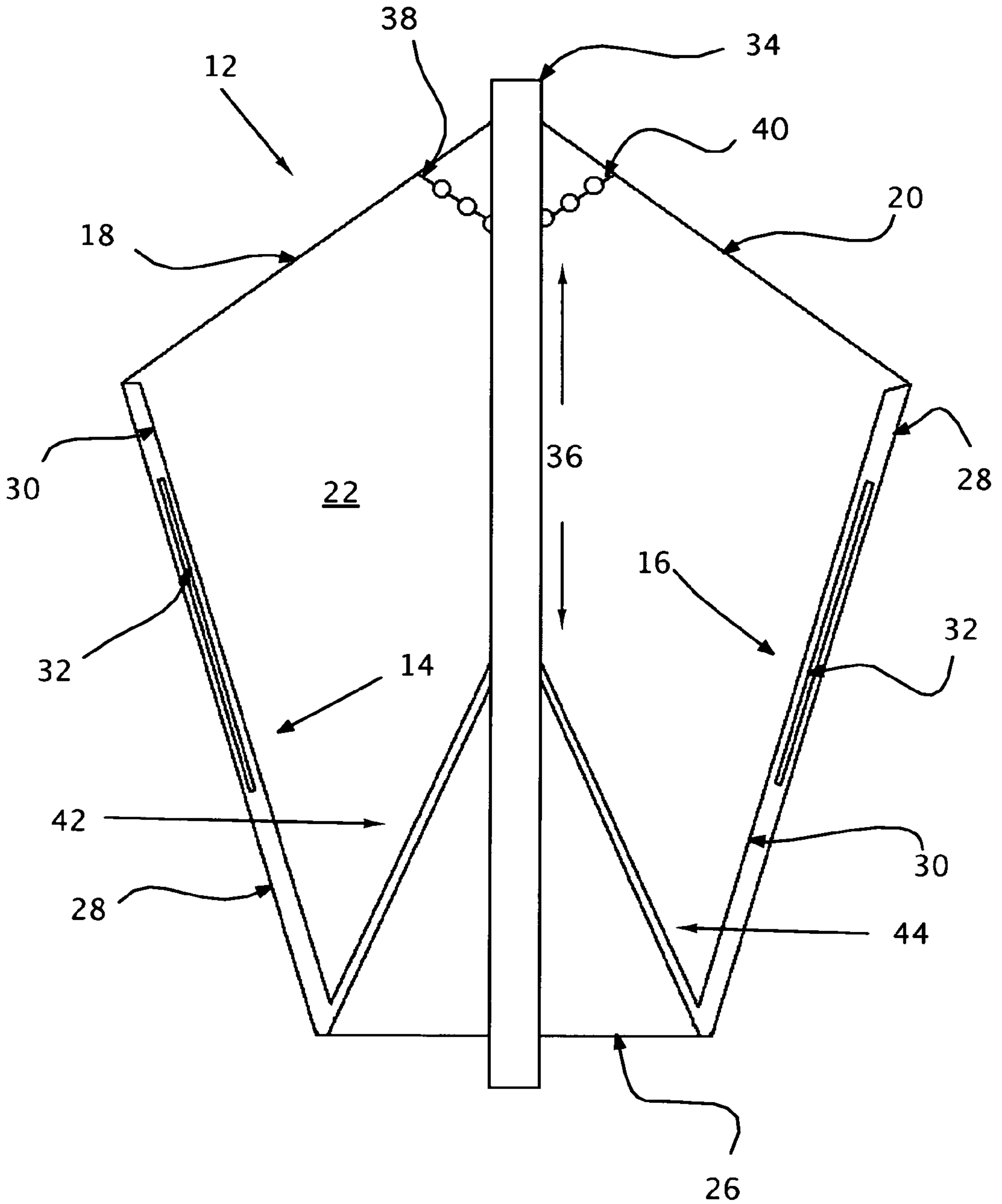
FIG. 2 is a cross-sectional view of the illuminated angular display system.

FIG. 2 illustrates components of the body 12 in more detail, including a interior and exterior defined by a first angled front panel 14 opposing a second angled front panel 16, contacting a third angled top panel 18 and a fourth angled top panel 20, respectively. A first side panel 22 and a second side panel 24 are illustrated in FIG. 3 and both contact a bottom panel 26, where the bottom panel 26 contacts the first and second angled front panels, 14 and 16, respectively, which both include a clear protective layer 28, a light enhancement layer 30, and at least one message layer 32.

FIG. 2 further illustrates the light enhancing system 36, including, a first angled light emitting diode panel 38 and a second angled light emitting diode panel 40. The first and second angled light emitting diode panels, 38 and 40, contact the third and fourth angled top panels, 18 and 20, respectively, and are countered a first and a second angled dispersing panels, 42 and 44, respectively, which contact the first and second angled front panels, 14 and 16, respectively.

Figure 3:
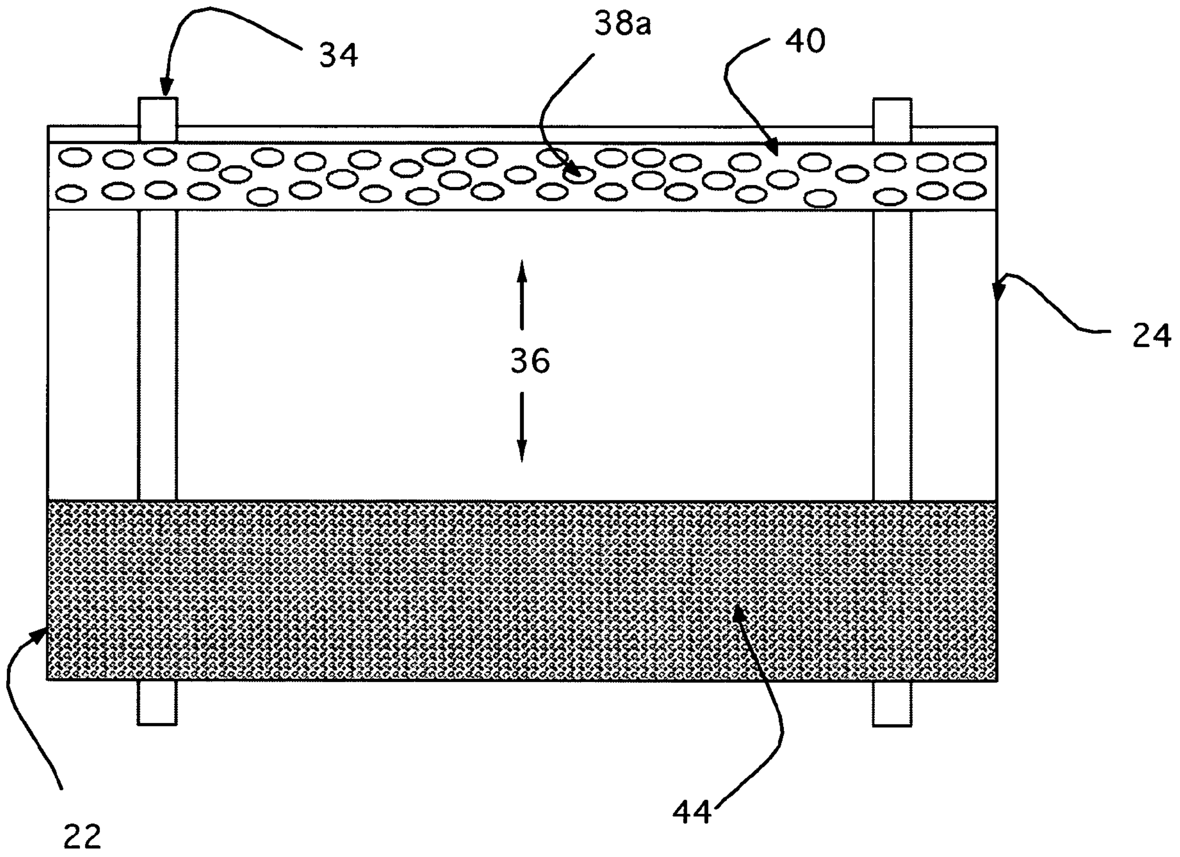
FIG. 3 is a front-sectional view of the illuminated angular display system, including a removed second angled front panel and a fourth angled top panel.

FIG. 3 illustrates the second angled light emitting diode panel 40 and the second angled dispersing panel 44, of the light enhancing system 36, countering one another. Light emitting from the plurality of light emitting diodes **38*a* is transmitted and dispersed by the angled dispersing panel 44, illuminating the at least one message layer 32, as illustrated in FIG. 1. The first and second side panels, 22 and 24, are also illustrated in FIG. 3, and are comprised of material similar to the first and second angled dispersing panels, 42 and 44, and function to disperse the light transmitted by the light enhancing system 36**.

Figure 4:
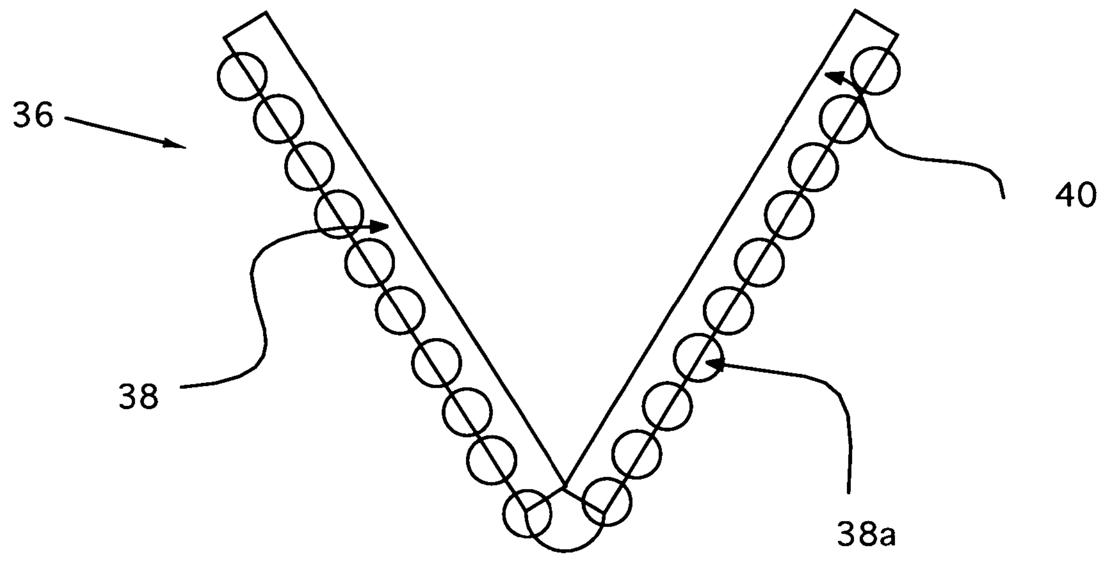
FIG. 4 is a side perspective of a first angled light emitting diode panel and a second angled light emitting diode panel of a light enhancing system.
Figure 5:
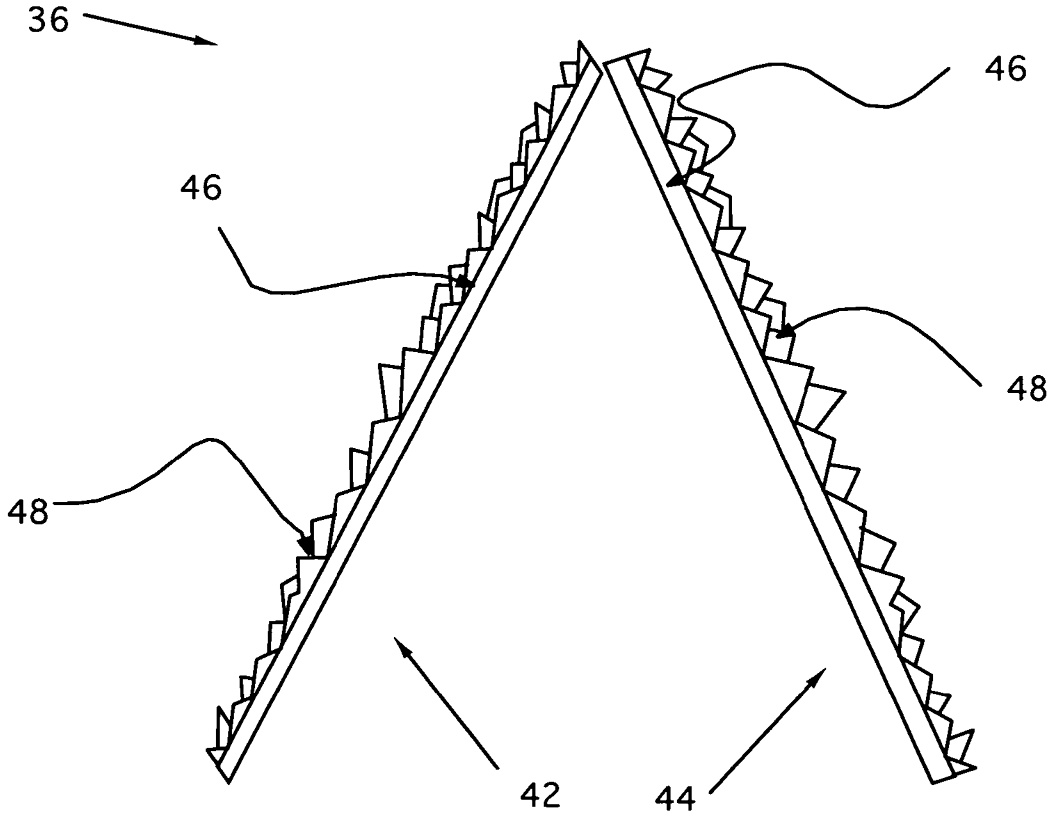
FIG. 5 is a side perspective a first angled dispersing panel and a second angled dispersing panel of the light enhancing system.

FIGS. 4 and 5 illustrate the light enhancing system 36, in more detail. FIG. 4 illustrates the first and second light emitting diode panels, 38 and 40, including a plurality of light emitting diodes **38*a*, which generate light used by the light enhancing system 36. FIG. 5 illustrates the first and second angled dispersing panels, 42 and 44, which include a light transmitting layer 46 and a light dispersal layer 48** with angular dispersing subunits.

Figure 6:
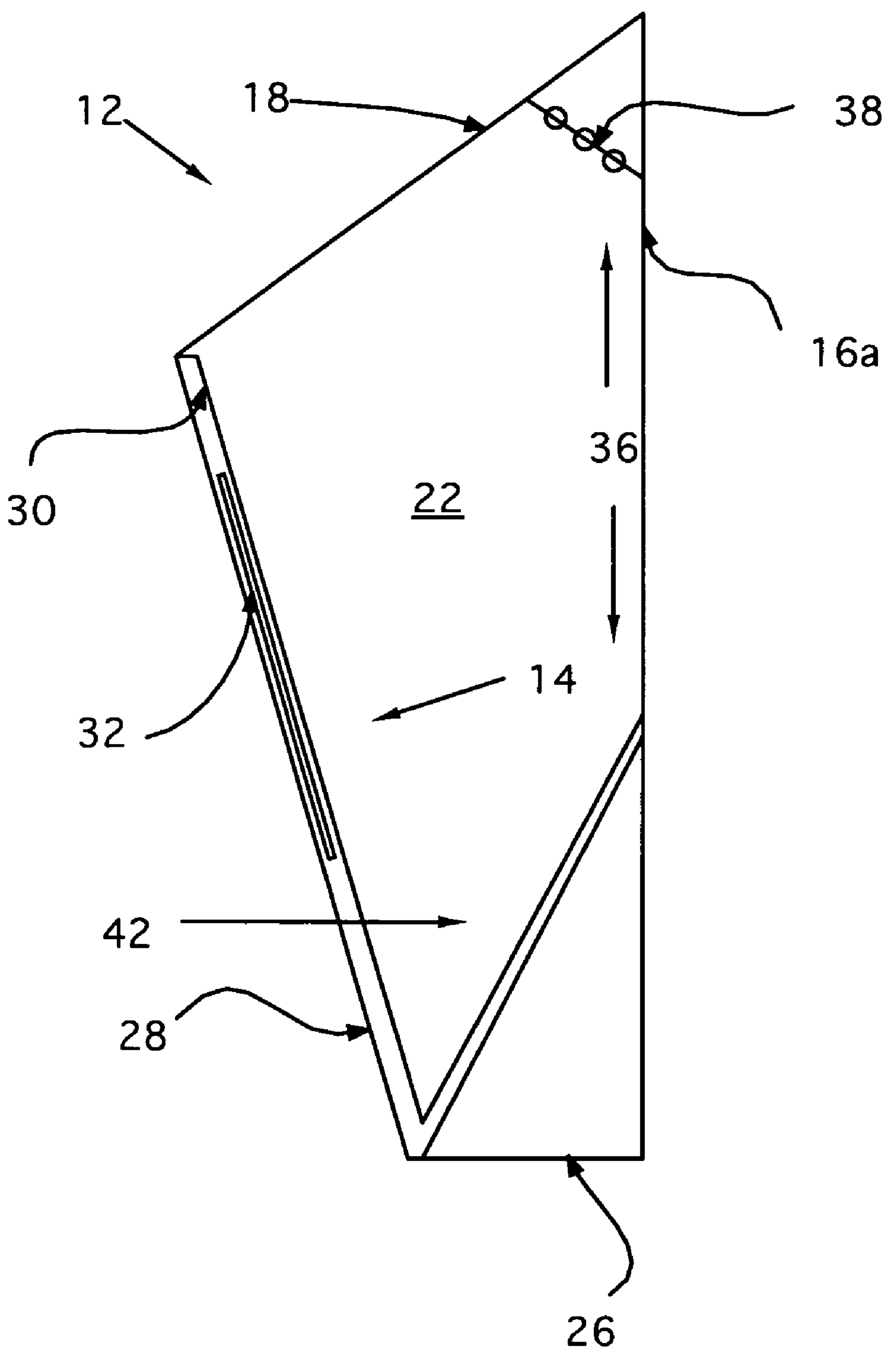
FIG. 6 is a cross-sectional view of an embodiment of the illuminated angular display system.

FIG. 6 illustrates an embodiment of the illuminated angular display system 10. The body 12 including the first angled front panel 14 and a second back panel **16*a*, where the first angled front panel 14 contacts the third angled top panel 18, the first and a second side panel, 22 and 24, respectively, and the bottom panel 26. The third angled top panel 18 contacts the second back panel 16*a*, where the second back panel 16*a* contacts the bottom panel 26**.

The first angled front panel 14 includes the clear protective layer 28, the light enhancement layer 30, and the at least one message layer 32. The plurality of support members 34 extend through the interior of the body 12 to the exterior. The light enhancing system 36, including, the first angled light emitting diode panel 36 and the plurality of light emitting diodes **38*a*, is located in the interior of the body 12 and contacts the second back panel 16*a* and the third angled top panel 18. The angled dispersing panel 42 including the light transmitting layer 46 and a light dispersal layer 48, is located in the interior of the body 12 and counters light of the angled light emitting diode panel 38 and ambient light projected through the third angled top panel 18, and also contacts the bottom panel 26, the first angled panel 14, and the second back panel 16*a***.

In use, the illuminating angular display system 10 generates, captures, transmits and disperses light. The light is absorbed by the light enhancing system 36 and transmitted and dispersed throughout the body 12. In one embodiment light is absorbed into the light enhancing system 36 though the third angled top panel 18 and fourth angled top panel 20, where the third angled top panel 18 and fourth angled top panel 20 are comprised of clear protective layers. In another embodiment light is absorbed through only the third angled top panel 18, where the third angled top panel contacts a second back panel 16*a*. In another embodiment the light is generated by the plurality of light emitting diodes 38*a*.

Angles contained within the illuminating angular display system 10 are a factor in achieving maximum transmittal and dispersal of light. Light generated by the first and second angled light emitting diode panels, 38 and 40, are angled substantially equal to 72 degrees. When used in conjunction with respective the first and second angled dispersing panels, 42 and 44, light is effectively transmitted and dispersed. In one embodiment the first and second angled dispersing panels, 42 and 44, are angled substantially equal to 60 degrees, and in another embodiment, 45 degrees.

The body 12, in an embodiment, includes a plurality of angles at 108 degrees. The angular structure allows for effective illumination of the at least one message layer 32 because the at least one message layer 32 is positioned at an optimal angle for receiving a maximum transmittal and dispersal of light from the first and second dispersing panels, 42 and 44. In another embodiment the body 12 includes the plurality of angles selected from a group consisting of angles below 108 degrees and above 108 degrees. The angular combination of the body 12 provides for effective illumination when used in conjunction with specific angles of the first and second light emitting diode panels, 38 and 40, and the first and second light dispersing panels, 42 and 44.

Material used in the first and second angled dispersing panels, 42 and 44, and the light enhancement layer 30, are a factor in achieving maximum transmission and dispersion of light. The first and second angled dispersing panels, 42 and 44, receive light. The light is then transmitted from the light transmitting layer 46 into the light dispersal layer 48. The light dispersal layer 48 disperses light into the angular dispersing subunits within the layer, and back to the transmitting layer 46, generating brilliant light rays.

The light dispersal layer 48 also disperses light to the at least one message layer 32, through the light enhancement layer 30, which also operates to disperse light through the at least one message layer 32 and protective layer 28, and back to the first and second angled dispersing panels, 42 and 44, undergoing the same transmission and dispersal process as described above. This effect contributes to maximum illumination within the system 10. The functioning of the angles and layers of the system is what distinguishes the message or image when viewed from long distances.

In one embodiment, the illuminating angular display system 10 can be attached to a freeway post or similar highway sign by the plurality of support members 34. In another embodiment the plurality of support members 34 are clear plastic, allowing passage of light. The plurality of support members 34 provide stability and integrity to the illuminating angular display system 10 by extending through the interior to the exterior, but also allow for flexibility in negating harsh environmental conditions on roads and highways by a pivoting feature within the plurality of support members 34. In another embodiment, the protective layer 28 is comprised of light, graffiti and abrasion resistant characteristics. This layer also functions to protect the integrity of the angular display system 10, increasing its longevity and lowering its maintenance needs.

The ability to discern a message or an image is essential. The ability to distinguish images or information when viewing from long distances, though adverse environmental conditions, as seen on our nations freeways and roads, is paramount. The illuminating angular display system 10 has the ability to take advantage of ambient and generated light by capturing, transmitting and dispersing through the system 10. The advantage is the light enhancing system 36, which, in conjunction with the angular features of the body 12, illuminates the message or display.

The light emitting diode panels, 38 and 40, including the plurality of light emitting diodes 38*a*, have several advantages. Light emitting diodes are significantly more energy-efficient than incandescent bulbs and can be designed to focus light. Incandescent and fluorescent sources often require an external reflector to collect light and direct it. Light emitting diodes are built inside solid cases. The cases protect them and unlike incandescent and discharge sources, make them extremely durable. Furthermore they have an extremely long life span, twice as long as the best fluorescent bulbs and twenty times longer than the best incandescent bulbs.

The light transmitting layer 46, light dispersal layer 48 and light enhancing layer 30, after receiving light from the light emitting diodes 38*a*, work in concert, providing feedback lighting within each other, and to each other, producing brilliant light rays. The angles contained within the body 12 take advantage of the brilliant light rays, and produce an extremely effective illumination. The net effect being the ability to distinguish the message or image from long distances, including those distances impeded by harsh environmental conditions.

While certain exemplary embodiments have been described and shown in the accompanying drawings, it is to understood that such embodiments are merely illustrative and not restrictive of the current invention, and that this invention is not restricted to the specific constructions and arrangements show and described since modification may occur to those ordinarily skilled in the art.

What is claimed:

1. A illuminating angular display system, comprising:

a body, including a interior, a exterior, a first angled front panel opposing a second angled front panel, contacting a third angled top panel, a fourth angled top panel, respectively, a first and a second side panel, a bottom panel, the bottom panel contacting the first and second angled front panels, including the first and second side panels, the third angled top panel contacting the fourth angled panel, the first and second angled front panels, including, a clear protective layer, a light enhancement layer, a at least one message layer, the third and fourth angled top panels, including a clear protective layer;

a plurality of support members, extending through the interior of the body to the exterior; and a light enhancing system, including, a first and a second angled light emitting diode panel, including a plurality of light emitting diodes, interiorly, contacting the third and fourth angled top panels, a first and a second angled dispersing panels, including a light transmitting layer and a light dispersal layer, interiorly, dispersing light of the first and second angled light emitting diode panels and ambient light projected through the third and fourth angled top panels, and contacting the bottom panel, and the first and second angled front panels, respectively.

2. The illuminating angular display system of claim 1, wherein the interior of the body includes a plurality of angles at 108 degrees.

3. The illuminating angular display system of claim 1, wherein the interior of the body includes a plurality of angles selected from a group consisting of angles below 108 degrees and above 108 degrees.

4. The illuminating angular display system of claim 3, wherein the first and second angled front panels include message layers.

5. The illuminating angular display system of claim 4, wherein the first and second side panels are comprised of metal.

6. The illuminating angular display system of claim 5, wherein the plurality of support members are comprised of clear plastic.

7. The illuminating angular display system of claim 1, wherein the first and second angled dispersing panels are angled substantially equal to 60 degrees.

8. The illuminating angular display system of claim 1, wherein the first and second angled dispersing panels are angled substantially equal to 45 degrees.

9. The illuminating angular display system of claim 2, wherein the first and second angled light emitting diode panels are angled substantially equal to 72 degrees.

10. The illuminating angular display system of claim 3, wherein the first and second angled light emitting diode panels are angled substantially equal and comprise a remainder of the third and fourth top panel angle.

11. The illuminating angular display system of claim 1, including a metal insert frame connecting the first and second angled front panels, the third and fourth angled top panels, and the first and second side panels and the bottom.

12. A illuminating angular display system, comprised of:

a body, including a interior, a exterior, a first angled front panel, a second back panel, the first angled front panel contacting a third angled top panel, a first and a second side panel, a bottom panel, the bottom panel contacting the first angled front panel, the first and second side panels and the second back panel, the third angled top panel contacting the second back panel, the first angled front panel, including, a clear protective layer, a light enhancement layer and a message layer, the third angled top panel, including a clear protective layer;

a plurality of support members, extending through the interior of the body to the exterior; and a light enhancing system, including, a angled light emitting diode panel, including a plurality of light emitting diodes, interiorly, contacting the second back panel and the third angled top panel, an angled dispersing panel, including a light transmitting layer and a light dispersal layer, interiorly, countering light of the angled light emitting diode panel and ambient light projected through the third angled top panel, contacting the bottom panel, the first angled front panel and second back panel.

13. The illuminating angular display system of claim 12, wherein the interior of the body includes a plurality of angles, including at least one angle substantially equal to 108 degrees.

14. The illuminating angular display system of claim 12, including a plurality of angles, wherein a angle between the bottom panel and the second back panel is substantially equal to 90 degrees.

15. The illuminating angular display system of claim 13, wherein an angle between the bottom panel and the second back panel is substantially equal to 90 degrees.

16. The illuminating angular display system of claim 12, wherein the first and second side panels are comprised of metal.

17. The illuminating angular display system of claim 16, wherein the plurality of support members are comprised of clear plastic.

18. The illuminating angular display system of claim 12, wherein the angled dispersing panel angle is substantially equal to 45 degrees.

19. The illuminating angular display system of claim 12, wherein the angled light emitting diode panel is angled substantially equal to 54 degrees.

20. The illuminating angular display system of claim 12, wherein a metal insert frame connects the first angled front panel, the third angled top panel, and the first and second side panels and the bottom.

* * * * *